(12) United States Patent
Chen (10) Patent No.: US 10,288,116 B1
(45) Date of Patent: May 14, 2019

(54) LINEAR SLIDE RAIL AND METHOD FOR USING THE SAME

(71) Applicant: Feng-Tien Chen, Taichung (TW)

(72) Inventor: Feng-Tien Chen, Taichung (TW)

( * ) Notice: Subject to any disclaimer, the term of this patent is extended or adjusted under 35 U.S.C. 154(b) by 0 days.

(21) Appl. No.: 15/979,463

(22) Filed: May 15, 2018

(51) Int. Cl.
*F16C 29/06* (2006.01)

(52) U.S. Cl.
CPC ............................. *F16C 29/0633* (2013.01)

(58) Field of Classification Search
CPC ................................................. F16C 29/0633
See application file for complete search history.

(56) References Cited

U.S. PATENT DOCUMENTS

| | | | | |
|---|---|---|---|---|
| 3,721,478 A * | 3/1973 | Anderson | ............. | F16C 29/008 384/45 |
| 7,178,981 B2 * | 2/2007 | Rudy | ................. | F16C 29/0609 384/45 |
| 8,684,604 B2 * | 4/2014 | Chen | .................... | F16C 33/363 384/44 |
| 10,036,421 B2 * | 7/2018 | Matsumoto | ......... | F16C 29/0604 |

\* cited by examiner

*Primary Examiner* — Thomas R Hannon
(74) *Attorney, Agent, or Firm* — Che-Yang Chen; Law Offices of Scott Warmuth

(57) ABSTRACT

A linear slide rail includes a rail having four primary grooves respectively defined in two opposite sides of the rail. A first slide includes a first passage, and each of two opposite insides of the first passage has two first grooves. Multiple first balls contact the primary grooves and the first grooves. Each of the first grooves has a first contact angle. When a first wearing trace is formed along the rail by the first balls and the first slide, the first slide and the first balls are replaced with a second slide and multiple second balls. Each of the second grooves of the second slide has a second contact angle which is different from the first contact angle. A second wearing trace is formed along the rail by the second balls and the second slide. The first and second wearing traces are not overlapped with each other.

8 Claims, 12 Drawing Sheets

LINEAR SLIDE RAIL AND METHOD FOR USING THE SAME

BACKGROUND OF THE INVENTION

1. Fields of the Invention

The present invention relates to a linear slide rail, and more particularly, to a linear slide rail structure and a method for using the same.

2. Descriptions of Related Art

Figure 1:
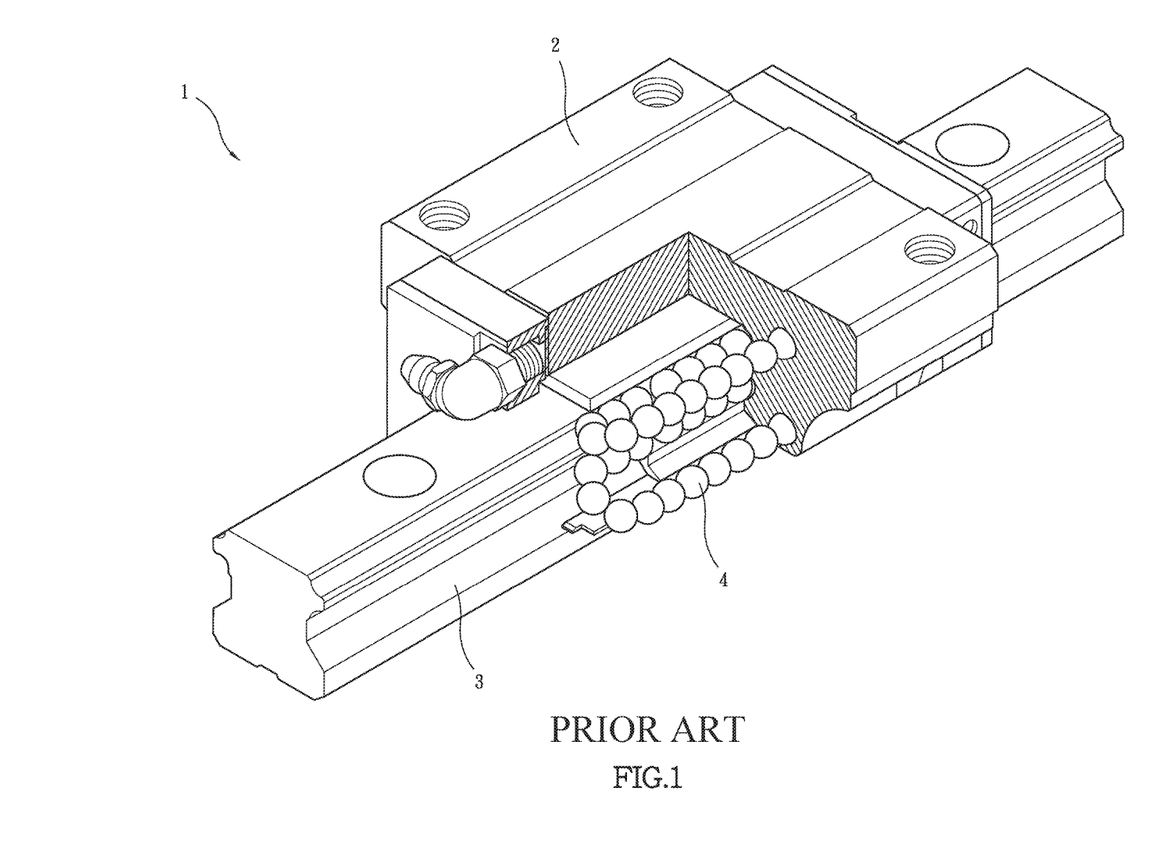
FIG. 1 is a perspective view, partly removed, of a conventional linear slide rail.

The conventional linear slide rail 1 known to applicant is disclosed in FIG. 1 and includes a slide 2, a rail 3, multiple balls 4 and other components such as dust cap, end cap and liquid return part, grease scraper, and ball retainers. The balls 4 are endlessly rotated between the rail 2 and the rail 3 so as to ensure that the slide 2 to move linearly and precisely under higher load.

Figure 2:
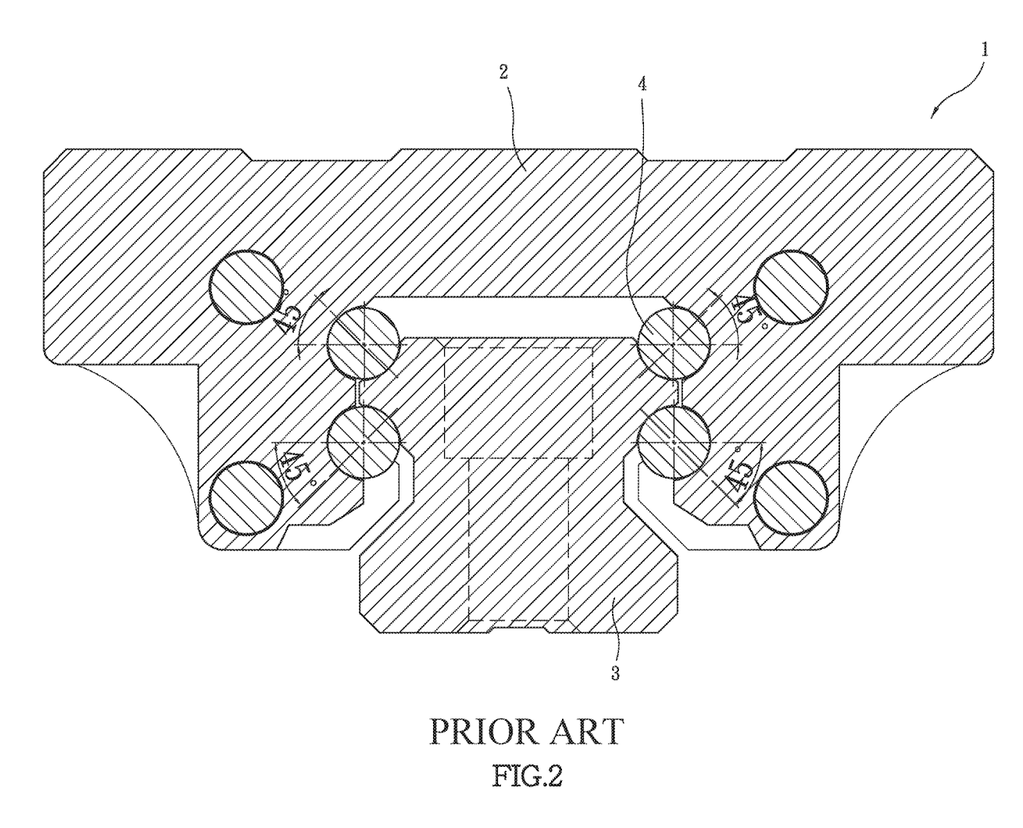
FIG. 2 is a cross sectional view to show a portion of the conventional linear slide rail.
Figure 3:
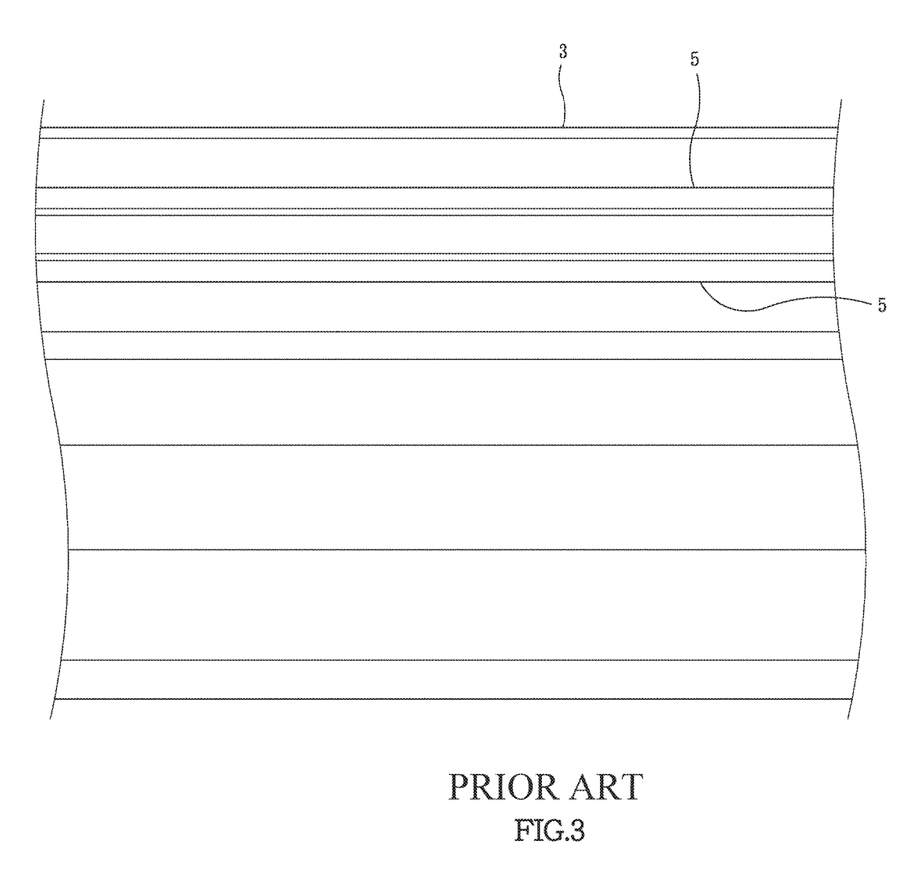
FIG. 3 shows the wearing traces of the conventional linear slide rail.

As shown in FIG. 2, a pressure is applied to the linear slide rail 1 when assembling, and which makes the balls 4 to be in contact with the slide 2 and the rail 3 by a contact angle which usually is 45 degrees. After a period of use, the balls 4 will wear and create linear wearing traces 5 as shown in FIG. 3 on the slide 2 and the rail 3. The wearing traces 5 reduce the transmission of the slide 2 and the precision of positioning and moving.

Generally, the whole set of the linear slide rail 1 including the slide 2, the rail 3 and the balls 4 will be replaced to ensure the desired features. Nevertheless, the replacement means high cost for the users.

The present invention intends to provide a linear slide rail that is designed to eliminate the drawbacks mentioned above.

SUMMARY OF THE INVENTION

The present invention relates to a linear slide rail and comprises a rail having four primary grooves, and each of two opposite sides of the rail has two of the primary grooves. A first slide has a first passage, and each of two opposite insides of the first passage has two first grooves defined therein. Each of the first grooves has a first contact angle. Multiple first balls are in contact with the primary grooves and the first grooves. A second slide has a second passage, and each of two opposite insides of the second passage has two second grooves defined therein. Each of the second grooves has a second contact angle which is different from the first contact angle. Multiple second balls are in contact with the primary grooves and the second grooves. When a first wearing trace is formed along the rail by the first balls and the first slide, the first slide and the first balls are replaced with the second slide and the second balls. A second wearing trace is formed along the rail by the second balls and the second slide. The first and second wearing traces are not overlapped with each other. The rail can be used with multiple sets of slides, and includes a longer life of use. The cost for maintenance of the linear slide rail is reduced.

The present invention also provides a method for using a linear slide rail, and the method comprises the following steps:

a step of having a rail: The rail has four primary grooves, and each of two opposite sides of the rail has two of the primary grooves.

a step of having a first slide and multiple first balls: The first slide has a first passage, and each of two opposite insides of the first passage has two first grooves defined therein. Each of the first grooves has a first contact angle. The first balls contact the primary grooves and the first grooves.

A step of replacing the first slide and the first balls with a second slide and second balls: When a first wearing trace is formed along the rail by the first balls and the first slide, the first slide and the first balls are replaced with a second slide and multiple second balls. The second slide has a second passage, and each of two opposite insides of the second passage has two second grooves defined therein. Each of the second grooves has a second contact angle which is different from the first contact angle. The second balls contact the primary grooves and the second grooves.

The primary objective of the present invention is to provide a linear slide rail and a method for using the linear slide rail, and the life of use of the rail is prolonged and the cost for maintenance of the linear slide rail is reduced.

The present invention will become more obvious from the following description when taken in connection with the accompanying drawings which show, for purposes of illustration only, a preferred embodiment in accordance with the present invention.

DETAILED DESCRIPTION OF THE PREFERRED EMBODIMENT

Referring to FIGS. 4 to 7, the first embodiment of the linear slide rail 100 of the present invention comprises a rail 90, a first slide 11, multiple first balls 12, a second slide 21, multiple second balls 22, a third slide 31 and multiple third balls 32.

Figure 4:
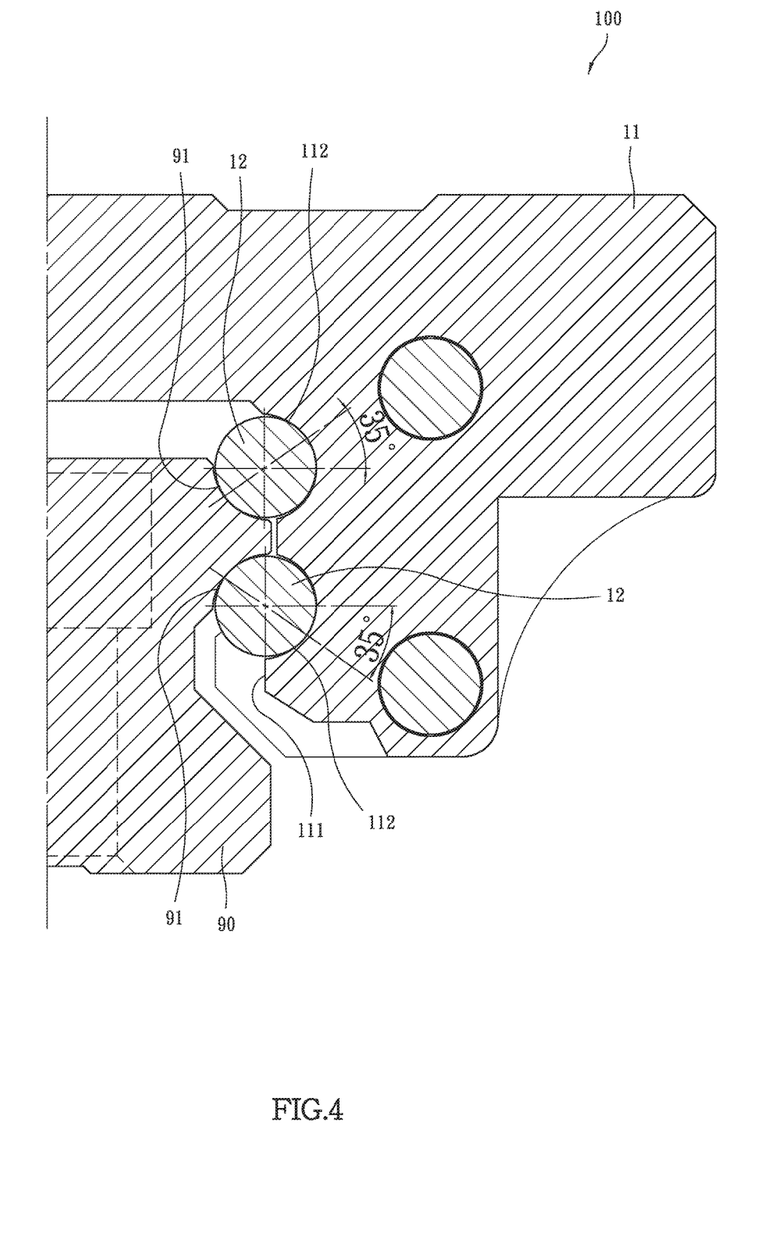
FIG. 4 is a cross sectional view of a portion of the linear slide rail of the present invention, wherein the first slide, the rail and the first balls are disclosed.

The rail 90 includes four primary grooves 91, wherein each of two opposite sides of the rail 90 has two of the primary grooves 91. These primary grooves 91 defined in the rail 90 are located in a form of back-to-back, also known as DB manner.

As shown in FIG. 4, the first slide 11 includes a first passage 111, and each of two opposite insides of the first passage 111 has two first grooves 112 defined therein. Each of the first grooves 112 has a first contact angle which is 35 degrees.

Figure 5:
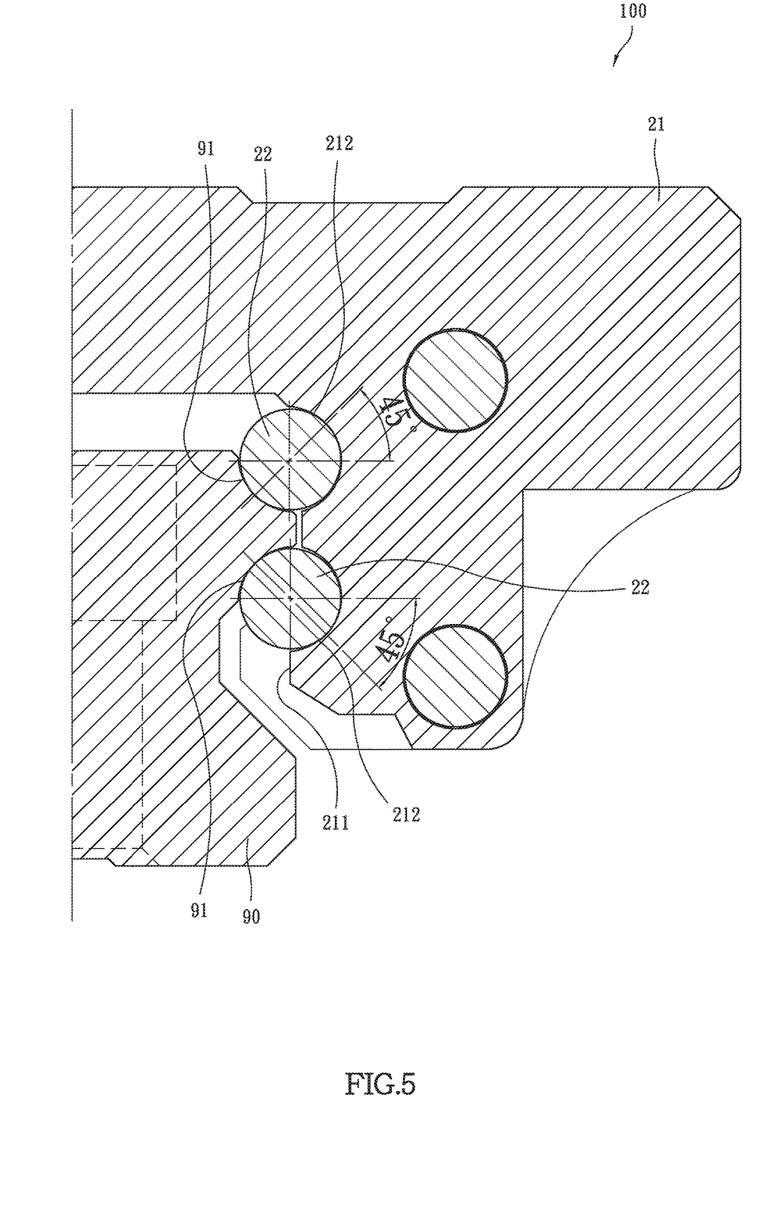
FIG. 5 is a cross sectional view of a portion of the linear slide rail of the present invention, wherein the second slide, the rail and the second balls are disclosed.

As shown in FIG. 5, the second slide 21 includes a second passage 211, and each of two opposite insides of the second passage 211 has two second grooves 212 defined therein. Each of the second grooves 212 has a second contact angle which is 45 degrees.

Figure 6:
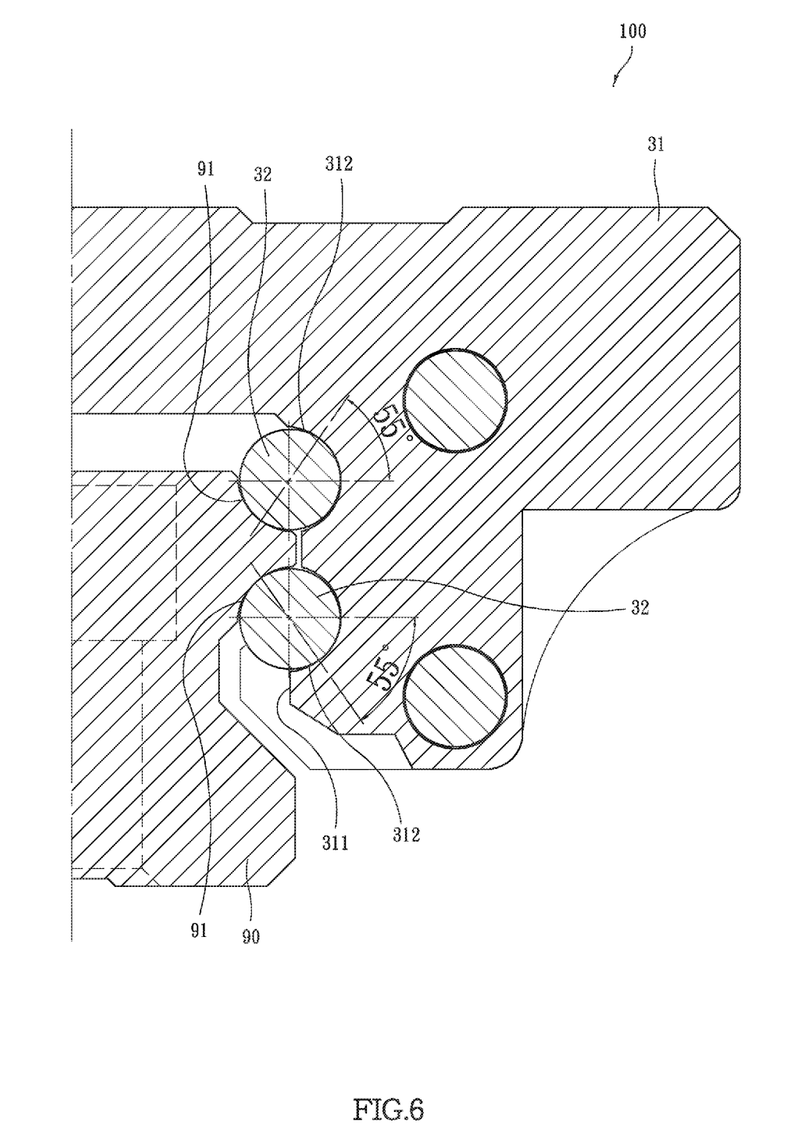
FIG. 6 is a cross sectional view of a portion of the linear slide rail of the present invention, wherein the third slide, the rail and the third balls are disclosed.

As shown in FIG. 6, the third slide 31 includes a third passage 311, and each of two opposite insides of the third passage 311 has two third grooves 312 defined therein. Each of the third grooves 312 has a third contact angle which is 55 degrees.

The first embodiment of the linear slide rail 100 is disclosed. The rail 90 extends through the first passage 111 of the first slide 11, and the first balls 12 are located between the primary grooves 91 of the rail 90 and the first grooves 112 of the first slide 11. The first balls 12 apply a pre-set pressure to the rail 90 and the first slide 11 so as to contact the lowest position of the inside of the primary grooves 91 of the rail 90 and the lowest position of the inside of the first grooves 112 of the first slide 11, as shown in FIG. 4. The first contact angle is 35 degrees.

Figure 7:
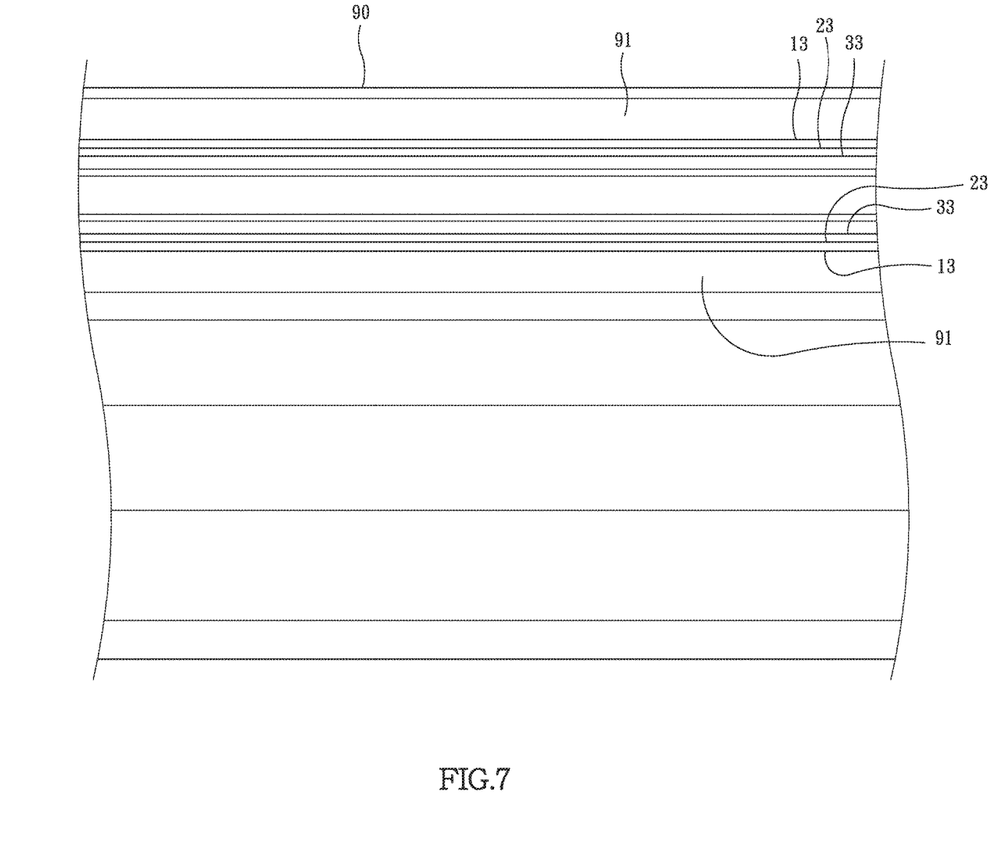
FIG. 7 shows the wearing trances formed on the rail of the present invention.
Figure 8:
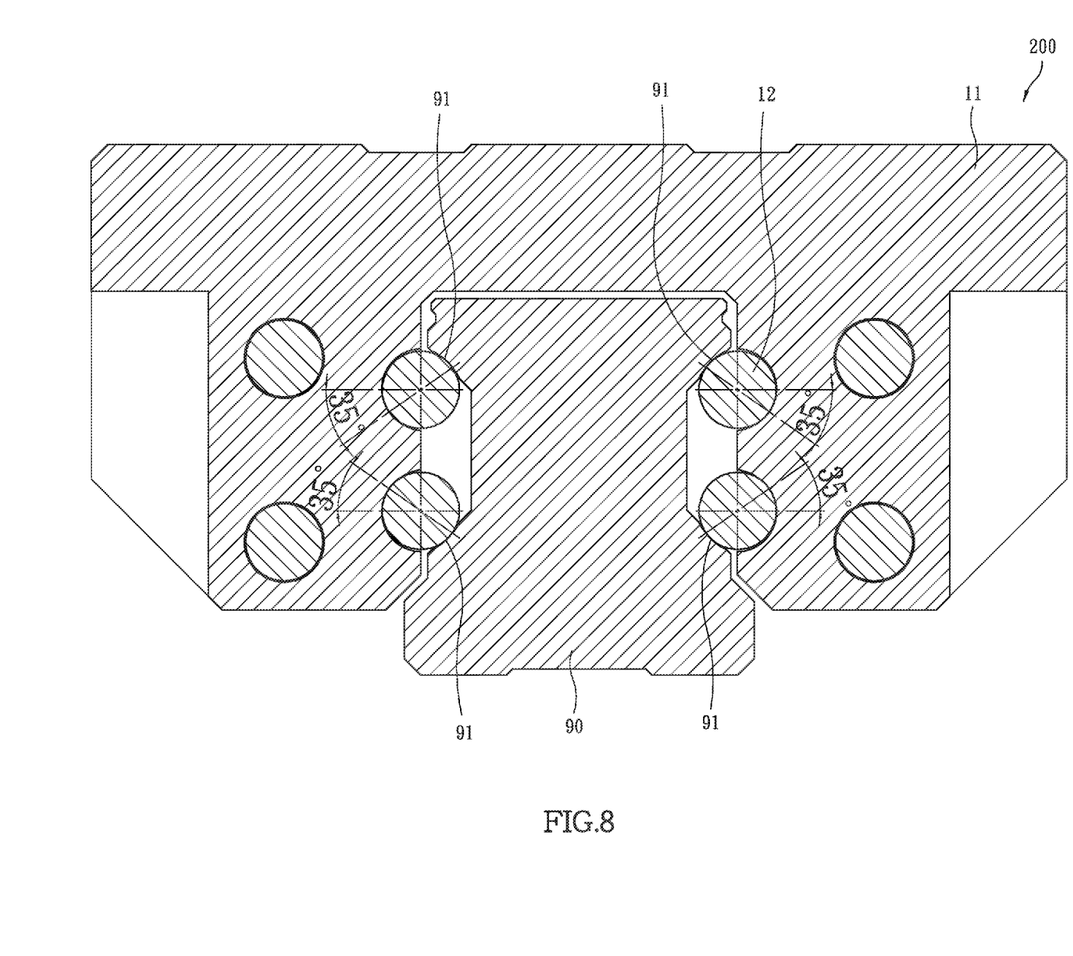
FIG. 8 is a cross sectional view of the second embodiment of the linear slide rail of the present invention, wherein the first slide, the rail and the first balls are disclosed.
Figure 9:
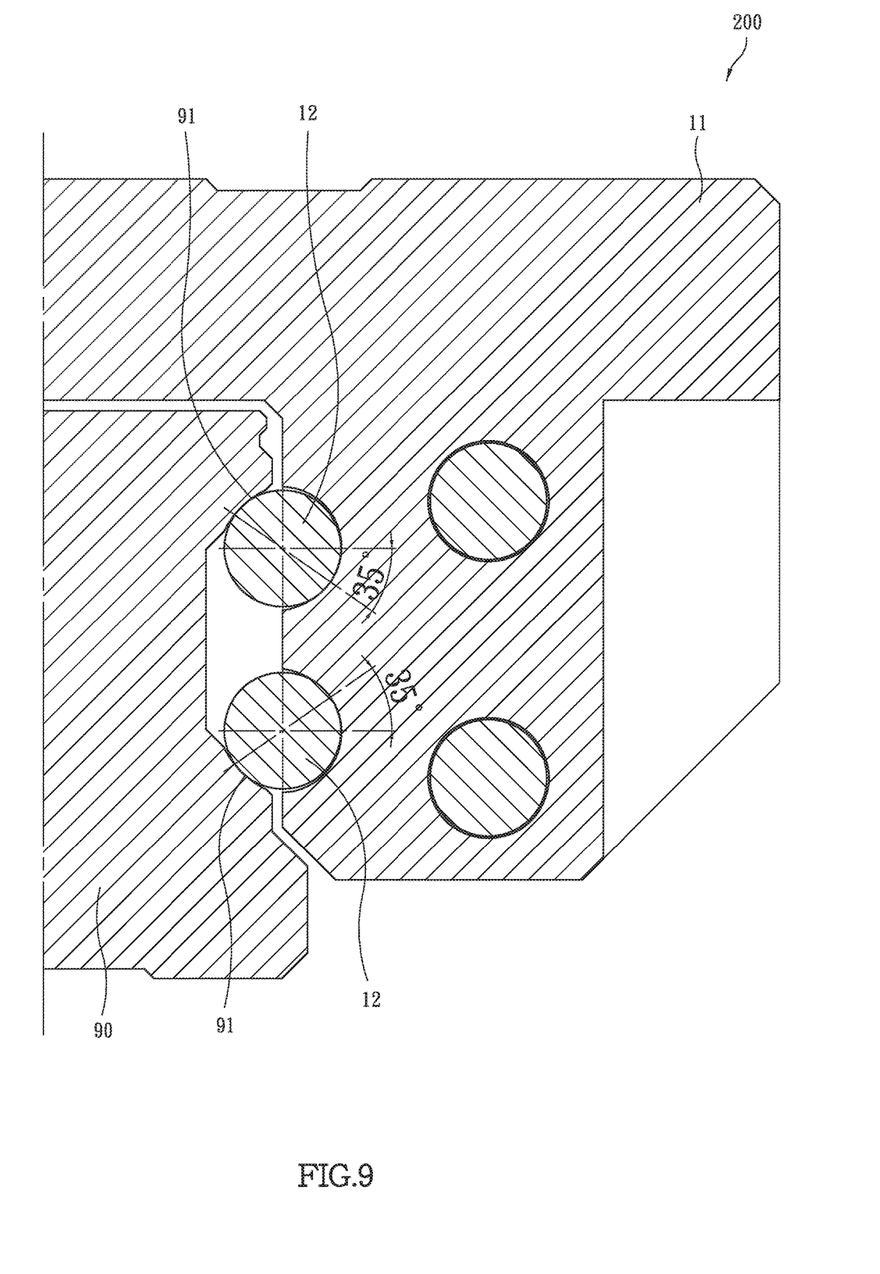
FIG. 9 is a cross sectional view of a portion of the second embodiment of the linear slide rail of the present invention, wherein the first slide, the rail and the first balls are disclosed.
Figure 10:
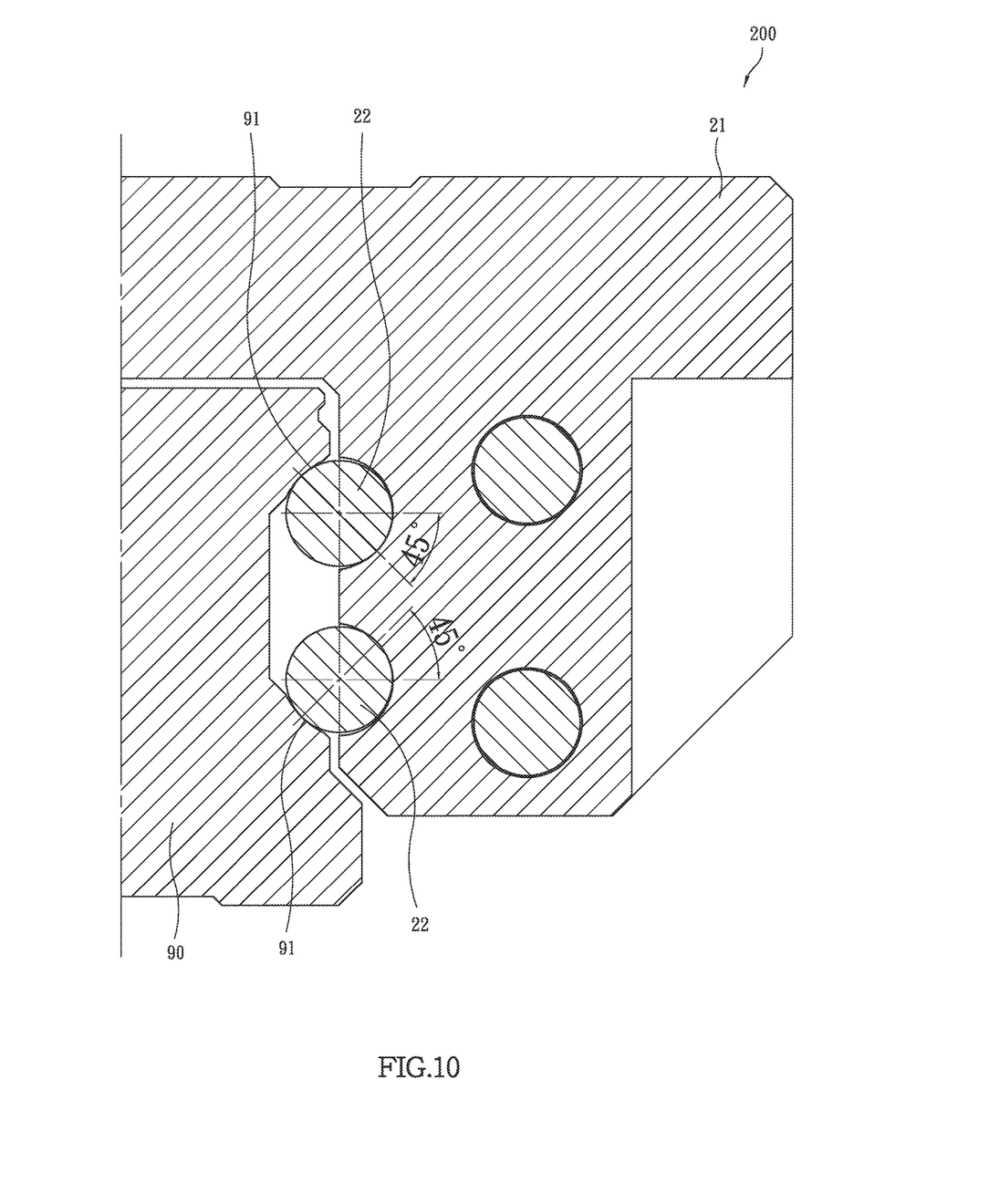
FIG. 10 is a cross sectional view of a portion of the second embodiment of the linear slide rail of the present invention, wherein the second slide, the rail and the second balls are disclosed.
Figure 11:
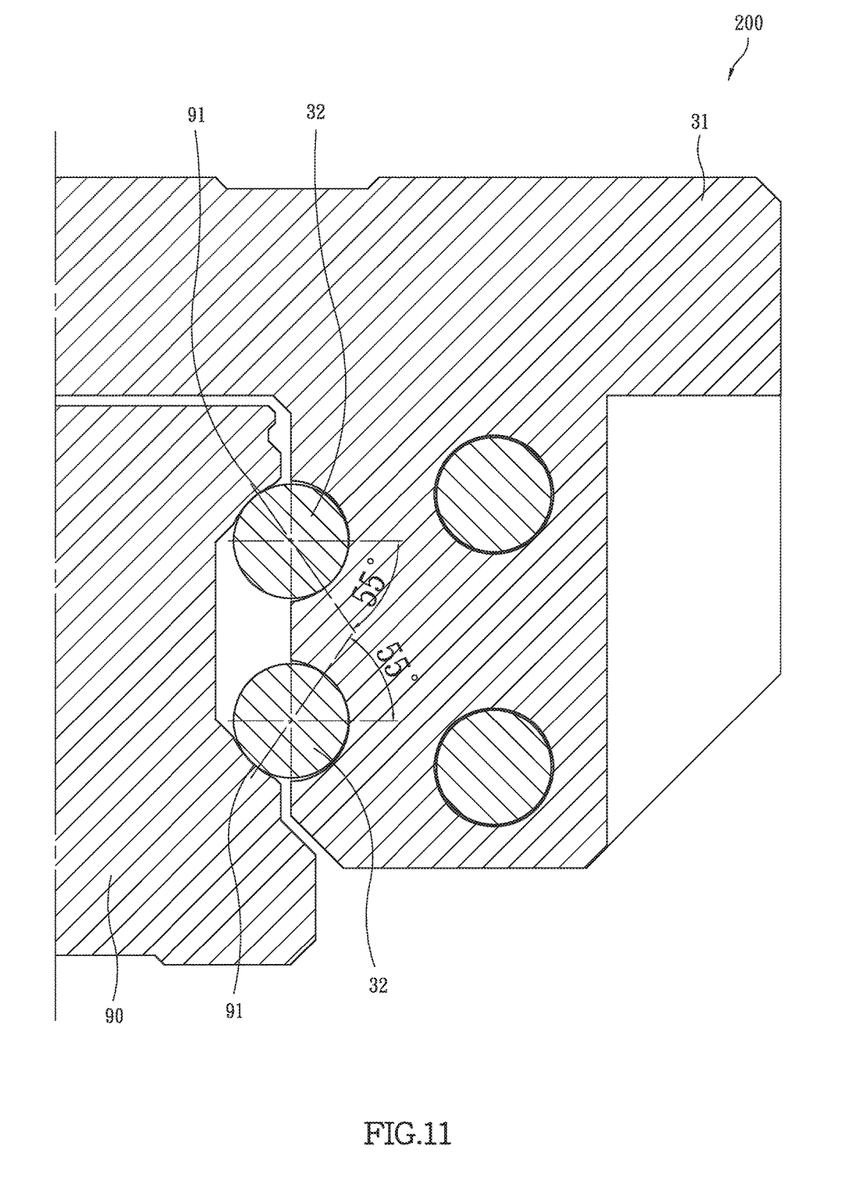
FIG. 11 is a cross sectional view of a portion of the third embodiment of the linear slide rail of the present invention, wherein the third slide, the rail and the third balls are disclosed.

After a period of time of use of the first slide 11 movable along the rail 90, a first wearing trace 13 which is a straight line is formed on the inside of the primary grooves 91 of the rail 90 and the inside of the first grooves 112 of the first slide 11, as shown in FIG. 7 which shows the first wearing traces 13 on the rail 90 only. The first slide 11 therefore does not move smoothly and precisely. The first slide 11 and the first balls 12 are then removed from the rail 90.

The rail 90 then extends through the second passage 211 of the second slide 21, and the second balls 22 are located between the primary grooves 91 of the rail 90 and the second grooves 212 of the second slide 21. The second balls 22 apply a pre-set pressure to the rail 90 and the second slide 21 so as to contact the lowest position of the inside of the primary grooves 91 of the rail 90 and the lowest position of the inside of the second grooves 212 of the second slide 21, as shown in FIG. 5. The second contact angle is 45 degrees. The second balls 22 are driven by the second grooves 212 of the second slide 21, so that the path that the second balls 22 rotatably contact the primary grooves 91 of the rail 90 is not overlapped with the first wearing trace 13. Therefore, the precision and movement of the second slide 21 maintain the desired standard.

After a period of time of use of the second slide 21 movable along the rail 90, a second wearing trace 23 which is a straight line is formed on the inside of the primary grooves 91 of the rail 90 and the inside of the second grooves 212 of the second slide 21, as shown in FIG. 7. The second slide 21 therefore does not move smoothly and precisely. The second slide 21 and the second balls 22 are then removed from the rail 90. The second wearing trace 23 is not overlapped to the first wearing trace 13.

Finally, the rail 90 extends through the third passage 311 of the third slide 31, and the third balls 32 are located between the primary grooves 91 of the rail 90 and the third grooves 312 of the third slide 31. The third balls 32 apply a pre-set pressure to the rail 90 and the third slide 31 so as to contact the lowest position of the inside of the primary grooves 91 of the rail 90 and the lowest position of the inside of the third grooves 312 of the third slide 31 as shown in FIG. 6. The third contact angle is 55 degrees. The third balls 32 are driven by the third grooves 312 of the third slide 31, so that the path that the third balls 32 rotatably contact the primary grooves 91 of the rail 90 is not overlapped with the first and second wearing trace 13, 23. Therefore, the precision and movement of the third slide 31 maintain the desired standard.

After a period of time of use of the third slide 31 movable along the rail 90, a third wearing trace 33 which is a straight line is formed on the inside of the primary grooves 91 of the rail 90 and the inside of the third grooves 312 of the third slide 31, as shown in FIG. 7. The third slide 31 therefore does not move smoothly and precisely. The third slide 3 and the third balls 32 are then removed from the rail 90. A new linear slide rail 100 is replaced. The third wearing trace 33 is not overlapped to the first and second wearing traces 13, 23.

The first contact angle of the first slide 11 is 35 degrees, the second contact angle of the second slide 21 is 45 degrees, and the third contact angle of the third slide 31 is 55 degrees. In other words, the contact angles of the first, second and third slides 11, 21, 31 are different from each other, so that the they create the first, second and third wearing traces 13, 23, 33 on the rail 90. The first, second and third wearing traces 13, 23, 33 on the rail 90 are not overlapped with each other. Therefore, the rail 90 is cooperated with the combination of the first slide 11 and the first balls 12, the combination of the second slide 21 and the second balls 22, and the combination of the third slide 31 and the third balls 32, without worry of affecting the precision. The life of use of the rail 90 is triple than the conventional ones so that the cost for the rail 90 is reduced.

The number of use of the rail 90 of the linear slide rail 100 is adjusted according to practical needs. The sequence of use of the first, second and third slides 11, 21, 31 is not limited.

FIGS. 8 to 12 show the second embodiment of the linear slide rail 200 of the present invention, and comprises a rail 90, a first slide 11, multiple first balls 12, a second slide 21, multiple second balls 22, a third slide 31 and multiple third balls 32. The difference from the previous embodiment is that the four primary grooves 91 defined in the rail 90 are located in a form of face-to-face, also known as DF manner.

Figure 12:
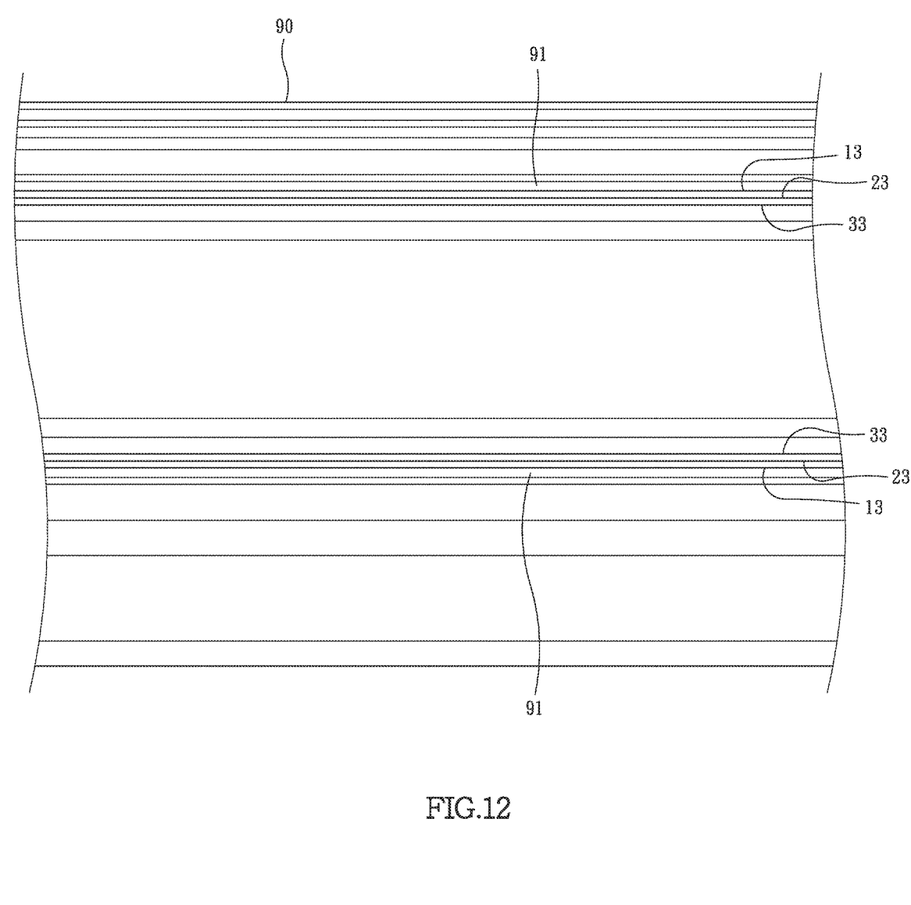
FIG. 12 shows the wearing traces on the rail of the first embodiment of the linear slide rail of the present invention.

The first, second and third wearing traces 13, 23, 33 of the second embodiment do not overlapped with each other, and the features achieved of the second embodiment are the same as those seen in the first embodiment.

While we have shown and described the embodiment in accordance with the present invention, it should be clear to those skilled in the art that further embodiments may be made without departing from the scope of the present invention.

What is claimed is:
1. A linear slide rail comprising:
a rail having four primary grooves, each of two opposite sides of the rail having two of the primary grooves;
a first slide having a first passage, each of two opposite insides of the first passage having two first grooves defined therein, each of the first grooves having a first contact angle;
multiple first balls;

a second slide having a second passage, each of two opposite insides of the second passage having two second grooves defined therein, each of the second grooves having a second contact angle which is different from the first contact angle;

multiple second balls, and when a first wearing trace is formed along the rail by the first balls and the first slide, the first slide and the first balls are replaced with the second slide and the second balls, a second wearing trace is formed along the rail by the second balls and the second slide, the first and second wearing traces are not overlapped with each other.

2. The linear slide rail as claimed in claim 1, wherein the four primary grooves defined in the rail are located in a form of back-to-back.

3. The linear slide rail as claimed in claim 1, wherein the four primary grooves defined in the rail are located in a form of face-to-face.

4. The linear slide rail as claimed in claim 1 further comprising a third slide and multiple third balls, the third slide having a third passage, each of two opposite insides of the third passage having two third grooves defined therein, each of the third grooves having a third contact angle which is different from the second contact angle and the first contact angle.

5. A method for using a linear slide rail, comprising:

a step of having a rail: the rail having four primary grooves, each of two opposite sides of the rail having two of the primary grooves;

a step of having a first slide and multiple first balls: the first slide having a first passage, each of two opposite insides of the first passage having two first grooves defined therein, each of the first grooves having a first contact angle, the first balls contacting the primary grooves and the first grooves;

a step of replacing the first slide and the first balls with a second slide and multiple second balls when a first wearing trace is formed along the rail by the first balls and the first slide: the second slide having a second passage, each of two opposite insides of the second passage having two second grooves defined therein, each of the second grooves having a second contact angle which is different from the first contact angle, the second balls contacting the primary grooves and the second grooves.

6. The method as claimed in claim 5, wherein the four primary grooves defined in the rail are located in a form of back-to-back.

7. The method as claimed in claim 5, wherein the four primary grooves defined in the rail are located in a form of face-to-face.

8. The method as claimed in claim 5, wherein a second wearing trace is formed along the rail by the second balls and the second slide after the second slide and the second balls are used on the rail, the first and second wearing traces are not overlapped with each other, the second slide and the second balls are replaced with a third slide and multiple third balls, the third slide has a third passage, each of two opposite insides of the third passage has two third grooves defined therein, each of the third grooves has a third contact angle which is different from the second contact angle and the first contact angle, the third balls contact the primary grooves and the third grooves, a third wearing trace is formed along the rail by the third balls and the third slide, the third trace is not overlapped with the first and second wearing traces.

* * * * *